(12) United States Patent
Gao et al.

(10) Patent No.: US 10,540,683 B2
(45) Date of Patent: Jan. 21, 2020

(54) MACHINE-LEARNED RECOMMENDER SYSTEM FOR PERFORMANCE OPTIMIZATION OF NETWORK-TRANSFERRED ELECTRONIC CONTENT ITEMS

(71) Applicant: Microsoft Technology Licensing, LLC, Redmond, WA (US)

(72) Inventors: Huiji Gao, San Jose, CA (US); Yuan Gao, Sunnyvale, CA (US); Kun Liu, San Jose, CA (US); Liqin Xu, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 15/495,690

(22) Filed: Apr. 24, 2017

(65) Prior Publication Data

US 2018/0308124 A1 Oct. 25, 2018

(51) Int. Cl.
| | | |
|---|---|---|
| *G06Q 30/00* | (2012.01) | |
| *G06Q 30/02* | (2012.01) | |
| *G06Q 50/00* | (2012.01) | |
| *G06N 20/00* | (2019.01) | |

(52) U.S. Cl.
CPC ......... *G06Q 30/0251* (2013.01); *G06N 20/00* (2019.01); *G06Q 30/0277* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2003/0037041 | A1* | 2/2003 | Hertz | G06Q 30/02 |
| 2004/0215430 | A1* | 10/2004 | Huddleston | G06Q 10/10 |
| | | | | 703/2 |
| 2015/0100438 | A1* | 4/2015 | Malkin | G06Q 30/0277 |
| | | | | 705/14.73 |
| 2017/0017886 | A1* | 1/2017 | Gao | G06N 5/04 |
| 2018/0247222 | A1* | 8/2018 | Tolomei | H04L 67/22 |

\* cited by examiner

*Primary Examiner* — Alvin L Brown
(74) *Attorney, Agent, or Firm* — Hickman Palermo Becker Bingham LLP; Daniel D. Ledesma

(57) ABSTRACT

Machine learning techniques are described for generating recommendations using decision trees. A decision tree is generated based on training data that comprises multiple training instances, each of which comprises a feature value for each of multiple features and a label of a target variable. The multiple features correspond to attributes of multiple content delivery campaigns. Later, feature values of a content delivery campaign are received. The decision tree is traversed using the feature values to generate output. Based on the output, one or more recommendations are identified and the one or more recommendations are presented on a computing device.

20 Claims, 7 Drawing Sheets

US 10,540,683 B2

MACHINE-LEARNED RECOMMENDER SYSTEM FOR PERFORMANCE OPTIMIZATION OF NETWORK-TRANSFERRED ELECTRONIC CONTENT ITEMS

TECHNICAL FIELD

The present disclosure relates to machine learning and, more particularly, to optimizing gradient boosting for provide recommendations regarding electronic content items. SUGGESTED ART UNIT: 2121; SUGGESTED CLASSIFICATION: 706/902.

BACKGROUND

A goal of many providers of online content is to provide high quality and highly relevant content to many users to induce users to perform some action, such as viewing online video, sharing content with connections in a social network, etc.

A problem that many content providers experience is that their respective online content is not being delivered to the extent they had planned. For example, a particular content item is delivered over one or more networks to only one hundred users rather than to two thousand users that were expected. There could be many reasons for this, but content providers are largely left to guess what factors of an online content delivery campaign to change. Changing one or more factors without knowing the actual cause(s) of low delivery might result in no change or little change in the number of online viewers of the particular content item.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for using one or more machine learning techniques to generate recommendations for a content provider regarding how to improve performance of a content delivery campaign along one or more performance metrics, such as delivery, conversion rate, and audience reach. In one technique, a decision tree is generated whose nodes corresponds to features or attributes of multiple content delivery campaigns. The decision tree is traversed based on values of attributes of a particular content delivery campaign to determine a first prediction of how well the particular campaign might perform if activated. The decision tree is traversed again based on a different (but overlapping) set of attribute values of the particular campaign. The second traversal yields a second prediction regarding performance of the particular campaign. A recommendation is generated based on a difference between the second traversal and the first traversal and provided to a provider of the particular campaign. In this way, recommendations to a content provider are personalized and unique for that content delivery campaign.

System Overview

Figure 1:
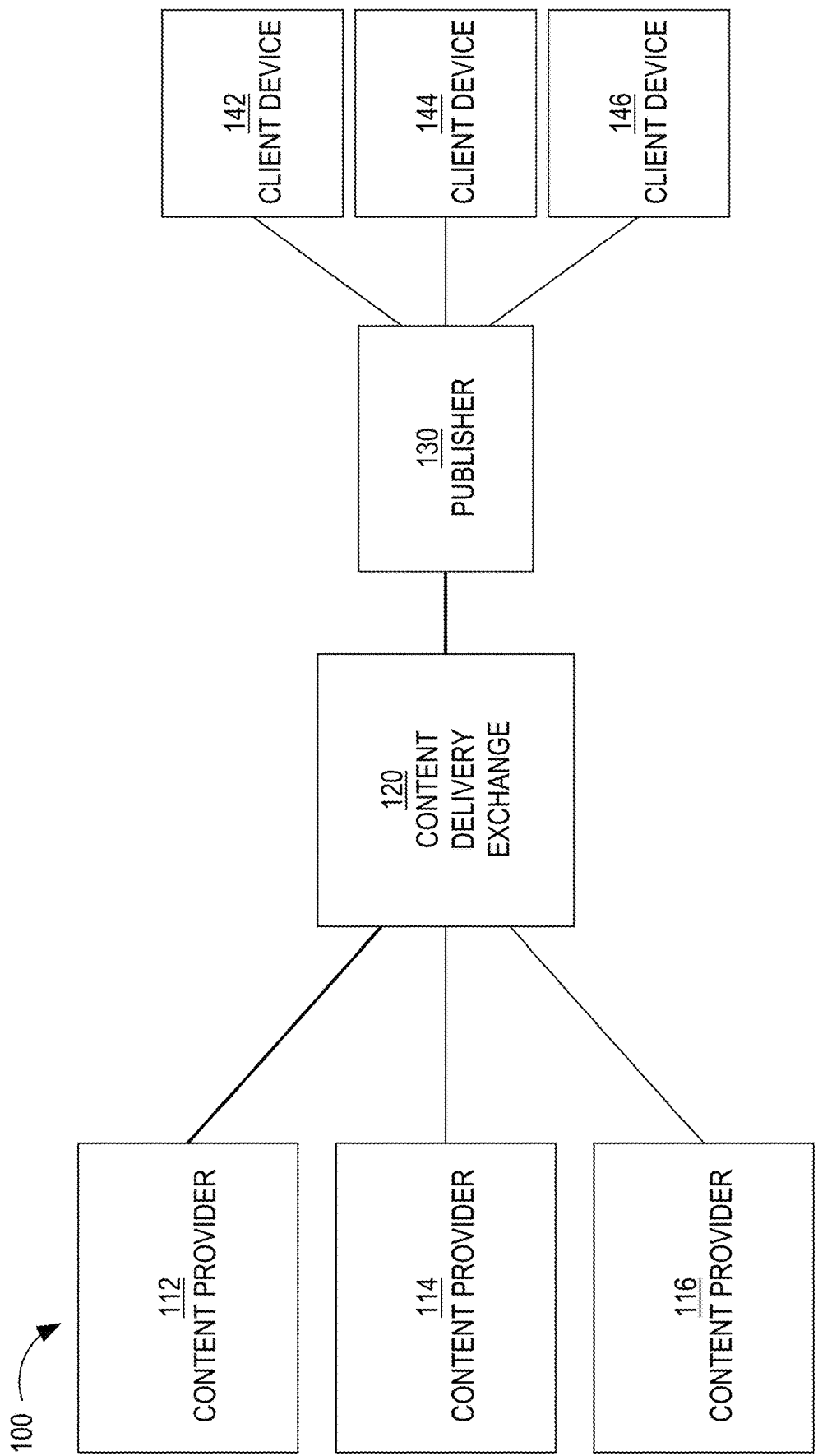
FIG. 1 is a block diagram that depicts a system for distributing content items to one or more computing devices, in an embodiment.

FIG. 1 is a block diagram that depicts a system 100 for distributing content items to one or more computing devices, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112, unless a target audience specified by content provider 112 is small enough.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that users.

A content delivery campaign has a start date/time and, optionally, a defined end date/time. For example, a content delivery campaign may be to present a set of content items from Jun. 1, 2017 to Aug. 1, 2017, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select or click on the set of content items, or when a certain number of users performing a particular action associated with the content delivery campaign, such as purchase a product/service or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), current geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Instead of one set of targeting criteria, the same content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different compensation schemes. For example, one content delivery campaign may compensate content delivery exchange 120 for each presentation of a content item from the content delivery campaign (referred to herein as cost per impression or CPM). Another content delivery campaign may compensate content delivery exchange 120 for each time a user interacts with a content item from the content delivery campaign, such as selecting or clicking on the content item (referred to herein as cost per click or CPC). Another content delivery campaign may compensate content delivery exchange 120 for each time a user performs a particular action, such as purchasing a product or service, downloading a software application, or filling out a form (referred to herein as cost per action or CPA). Content delivery exchange 120 may manage only campaigns that are of the same type of compensation scheme or may manage campaigns that are of any combination of the three types of compensation scheme.

Tracking User Interaction

Content delivery exchange 120 tracks one or more types of user interaction across client devices 142-146. For example, content delivery exchange 120 determines whether a content item that exchange 120 delivers is displayed by a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of user selection, a time of the user selection, a particular publisher or source (e.g., onsite v. offsite), a particular client device that displayed the specific content item, and/or a user identifier of a user that operates the particular client device.

Process Overview

Figure 2:
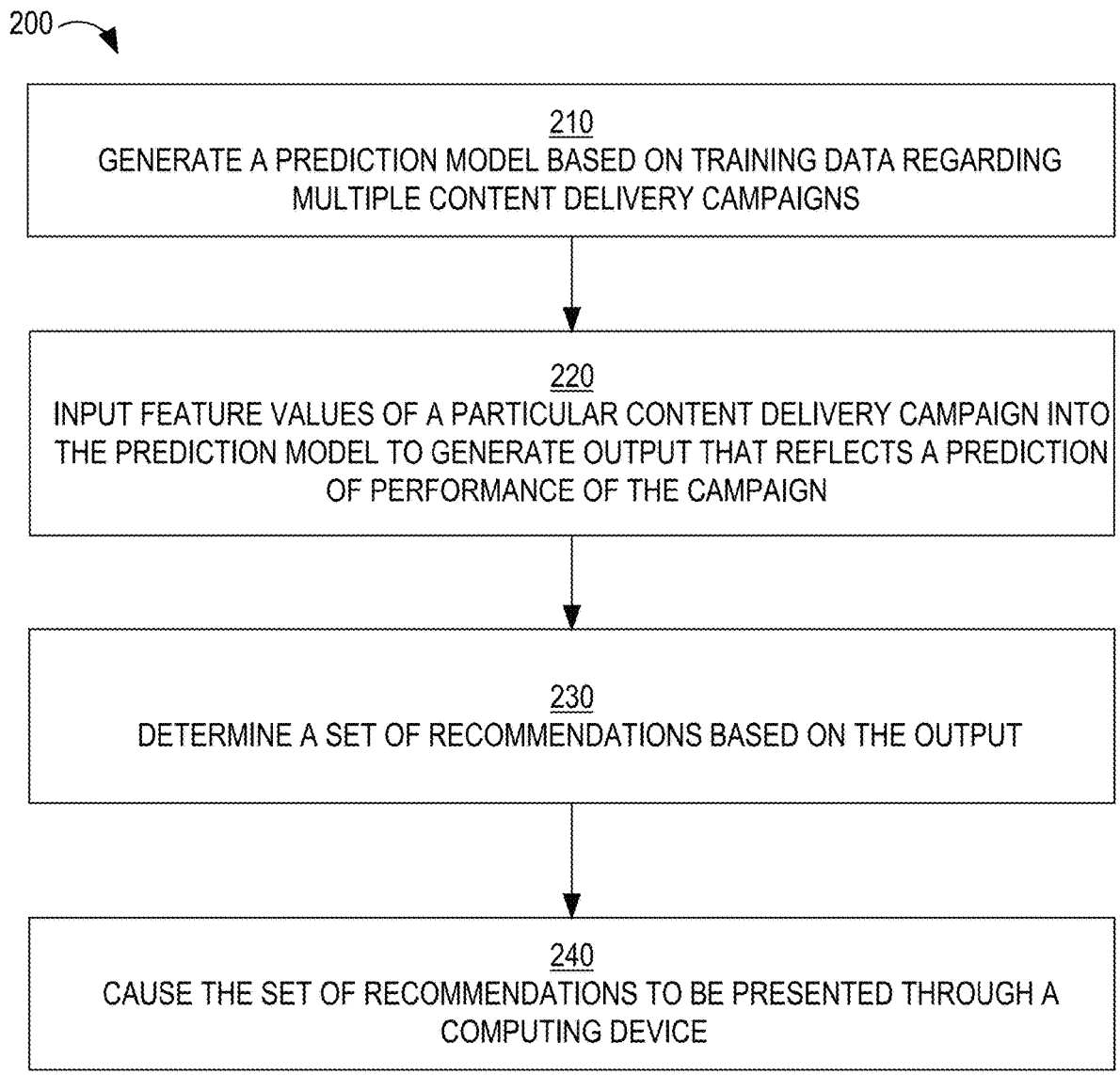
FIG. 2 is a flow diagram that depicts a process for predicting a performance of a content delivery campaign, in an embodiment.

FIG. 2 is a flow diagram that depicts a process 200 for predicting a performance of a content delivery campaign, in an embodiment. The predicted performance may be generated prior to the content delivery campaign being active or after the content delivery campaign has become active, such as in the early stages of the content delivery campaign when there have been a relatively few instances of content item of the campaign being selected (i.e., by content delivery exchange 120) and presented (e.g., displayed) through a client device. Process 200 may be implemented by one or more components of content delivery exchange 120.

At block 210, a prediction model is generated based on training data that includes multiple training instances. Each training instance includes multiple feature values, each corresponding to a different feature of multiple features and a label of a dependent (or "target") variable. Each training instance corresponds to a different content delivery campaign. Thus, the multiple features correspond to (or are mapped to) attributes a content delivery campaign and the label indicates an actual performance of the content delivery campaign, such as daily budget utilization of the campaign, a computed cost-per-click of the campaign, a computed conversion rate of the campaign, or a campaign reach of the campaign.

At block 220, feature values of a particular content delivery campaign are input into the prediction model to generate output, which reflects a prediction of performance of the particular content delivery campaign.

At block 230, based on the output from the prediction model, a set of recommendations are determined. How the set of recommendations are determined may vary depending on the type of prediction model that was generated.

At block 240, the set of recommendations are presented on a computing device, such as a smartphone of a representative of a content provider that provided the particular content delivery campaign.

Campaign Performance Metrics

Different content providers may be interested in improving their respective content delivery campaigns in different ways. Example performance metrics of a content delivery campaign include campaign delivery, campaign conversion rate, campaign reach, and campaign cost-per-click (CPC).

Campaign delivery refers to how well a content delivery campaign is performing with users, where delivery performance may be measured through a number of impressions and/or clicks of one or more content items associated with the content delivery campaign.

Conversion rate refers to how well a content delivery campaign is at influencing users to perform an intended action of the content delivery campaign. Intended actions include watching a video, making a donation, purchasing a product or service, filling out a (e.g., online) form, subscribing for certain electronic content, etc. Campaign conversion may be measured as a relatively few users performing the intended action. Conversion rate of content delivery campaign may be measured as the percentage of users who click on a content item of the content delivery campaign and also perform the intended action of the content delivery campaign.

Campaign reach refers to how well content items of a content delivery campaign are reaching a relatively wide audience. A narrow audience scope is evidence that campaign reach is limited. However, in some cases, a content provider intentionally desires campaign reach to be limited, such as presenting content items only to CEOs of technology companies in the United States. Limited campaign reach may be measured in multiple ways, such as the number of different job titles, job functions, or industries of users to which the campaign has reached (e.g., who have viewed or clicked on a content item of the content delivery campaign), the age range of users to which the campaign has reached, a percentage in difference of gender of users to which the campaign has reached, the number of countries represented by users to which the campaign has reached, and the number of languages spoken by users to which the campaign has reached. Alternatively, campaign reach may be an actual number of known users that satisfy targeting criteria of a content delivery campaign and may be calculated by comparing the targeting criteria to user profiles in a profile database.

Cost-per-click (CPC) refers to how much a content provider pays per click by an end user, either on a per-campaign basis, a per-content item basis, or a cross-campaign basis (if the content provider has multiple campaigns that are currently active).

Machine Learning

In an embodiment, machine learning is used to generate a prediction model that is used to predict performance of a content delivery campaign. Machine learning is a subfield of computer science that evolved from the study of pattern recognition and computation learning theory in artificial intelligence. Machine learning explores the study and construction of algorithms that can learn from and make predictions on data. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is unfeasible. Example applications include spam filtering, optical character recognition (OCR), search engines, and computer vision.

Within the field of data analytics, machine learning is a method used to devise complex models and algorithms that lend themselves to prediction. These analytical models allow researchers, data scientists, engineers, and analysts to produce reliable, repeatable decisions and results and uncover hidden insights through learning from historical relationships and trends in the data.

Any machine learning technique may be used to generate the prediction model. Examples of machine learning algorithms include decision tree learning, association rule learning, artificial neural network, support vector machines, and Bayesian networks. Embodiments are not limited to any particular type of machine learning technique or algorithm.

Machine Learning Component

Figure 3:
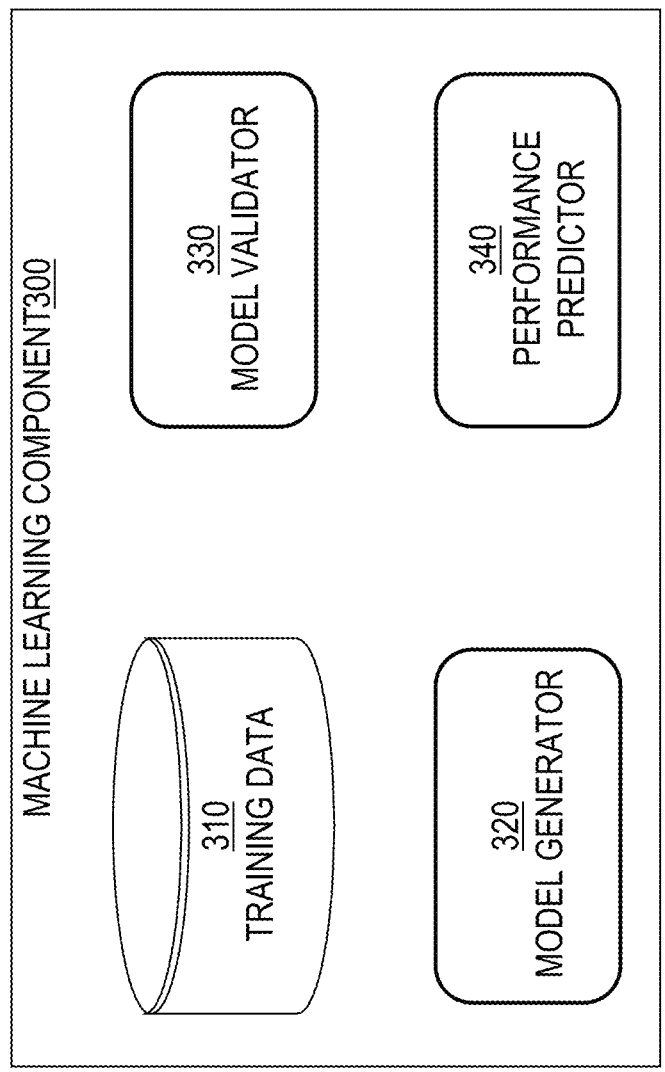
FIG. 3 is a block diagram that depicts components of a machine learning component, in an embodiment.

FIG. 3 is a block diagram that depicts components of a machine learning component 300, in an embodiment. Machine learning component 300 is implemented in software, hardware, or any combination of software and hardware. Machine learning component 300 may be part of content delivery exchange 120 or may be implemented one or more computing devices that are separate from content delivery exchange 120.

Machine learning component 300 includes a training database 310, a model generator 320, a model validator 330, and a performance predictor 340. Training database 310 may be implemented on any storage medium, including volatile or non-volatile storage media. Training database 310 contains one or more training sets, each of which includes data from each of multiple content delivery campaigns, including actual (previous) performance and one or more attributes or characteristics of the content delivery campaign that corresponds to the actual performance. Each training set may correspond to a different set of features. Example types of features of the prediction model include targeting features, campaign attribute features, serving features, text features, image features, and/or metadata features.

Example targeting features of the target audience include whether audience expansion is enabled, geographic location (e.g., North America, Brazil, Europe), language (e.g., English, Spanish, Chinese), industries (e.g., software, finance, marketing), job title(s), academic degree(s), skills, and size of current employer.

Enabling audience expansion may be a content provider-specified option. If enabled for a campaign, audience expansion allows content delivery exchange 120 to loosen the constraints on who can view a content item of the campaign. For example, if targeting criteria of a campaign specifies the United States as the geography and audience expansion is enabled, then the geography may include Canada and/or some Caribbean islands. As another example, if an age range of users to target is 25-34 years old and audience expansion is enabled, then the age range may be expanded to 23-37 years old. As another example, if "software" or "engineer" must appear in a current job title of users viewing a content item and audience expansion is enabled, then the other parts of the users' profiles may be analyzed for those terms, such as in a job description or past positions held.

Example of campaign attribute features (for which a history of a campaign being active is not required) include bid price, budget, and type of charging model (e.g., CPM, CPC, or CPA).

Example text features (if text is included in the campaign) include certain keywords, topic(s) referenced, number of words, number of nouns/adjectives/verbs/adverbs, and emoticons.

Example image features (if an image is included in the campaign) include whether a face is detected in the image, whether an eyeball is detected, average brightness, dominant color, etc. In an embodiment, a convolutional neural network (CNN) is used to generate a feature vector of an image. CNN is a type of feed-forward artificial neural network in which the connectivity pattern between the "neurons" in the network is inspired by the organization of the animal visual cortex. A CNN comprises multiple layers of receptive fields, which are collections of "neurons" that process portions of an input image. The output of these collections are then tiled so that their input regions overlap, to obtain a higher-resolution representation of the original image.

Example serving features include day of the week a campaign is active, filtering rate features, and competitiveness features. Filtering rate features and competitiveness features are features for content delivery campaigns that have been active at least for some time period in order to obtain statistics related to these features. Example filtering rate features include:

a frequency of rate of triggering or applying frequency capping (which limits how often a content item of the campaign is presented to any user in a period of time; e.g., 2 impressions per user per day, 1 click per user per week, 1 conversion per user per lifetime)

Thus, a frequency of triggering frequency capping is a number of times a campaign has been filtered out due to frequency capping relative to all content requests in which the campaign has been involved (e.g., where the targeting criteria of the campaign has been satisfied).

a frequency or rate of triggering or applying a budget constraint (which limits when the campaign can be considered due a budget constraint (e.g., out of budget))

Thus, a frequency of triggering a budget constraint is a number of times a campaign has been filtered out due to a budget constraint relative to all the content requests in which the campaign has been involved.

a frequency or rate of triggering a pacing restriction (which limits the rate at which a content item of a campaign is presented in a given time period, such as per day), a frequency or rate of triggering content provider de-duplication (which is when two campaigns from the same content provider and in response to the same content request are identified and, therefore, one of the campaigns is dropped in order to remove the scenario where a content provider is bidding against itself).

Example competitiveness features include percentile of bid relative to bids of other competitors (campaigns) that participated in the same auction as the campaign in question, pCTR (or predicted click-through rate, which may be based on a prediction model that predicts a click through rate based on attributes of a content item and/or campaign to which the content item belongs), eCPI (or effective cost-per-impression), average display position of content items of the campaign in question.

Model generator 320 reads a training set from training database 310 and implements one or more machine learning techniques (e.g., linear regression) to generate a prediction model. Model validator 330 validates the prediction model to verify that the prediction model produces relatively accurate results or predictions. If model validator 330 determines that a prediction model does not produce relatively accurate results, then model validator 330 ensures that the prediction model is not used by an end user to predict performance of a content delivery campaign. Model validator 330 may instruct model generator 320 to implement a machine learning technique that is different than the one that was used to generate the prediction model.

In an embodiment, if a prediction model is generated based on data from multiple content delivery campaigns that share a common set of one or more attributes or characteristics (e.g., campaign type, industry, geography, etc.), then that set of one or more attributes or characteristics are not used as feature(s) when training the prediction model or when using the prediction model to make a prediction.

Once a prediction model is generated and (optionally) validated, performance predictor 340 uses the prediction model is used to generate, for a particular content delivery campaign, a prediction of performance given a set of characteristics of the particular content delivery campaign, even though the exact characteristics of the particular content delivery campaign may not have been shared with any content delivery campaign upon which the prediction model is based. The prediction of performance may be for the entire duration of the campaign or a portion of the campaign's duration, such as a particular day or a particular week.

Performance predictor 340 may be activated to predict performance of a content delivery campaign based on user input. For example, a representative of a content provider submits data regarding a content delivery campaign and performance predictor 340 automatically predicts performance, producing an output. The output may be automatically provided to the representative (e.g., via a user interface, an electronic message transmitted to a device or account of the representative). Alternatively, the output may be behind a pay-wall such that payment must first be received or verified by performance predictor 340, content delivery exchange 120, or other component before the output is provided to the representative. Similarly, performance predictor 340 may only operate relative to a content delivery campaign when payment for the prediction has been received or verified.

The units of a predicted performance may vary depending on the units in the training set and the type of performance being predicted. For example, if the prediction is daily budget utilization, then the units may be in a percentage of a daily budget (e.g., 95%) or a dollar amount (e.g., $786). If the performance is cost per click (CPC), then the units may be in dollars.

Multiple Prediction Models

In an embodiment, multiple prediction models are generated and utilized. For example, one prediction model may be generated for content delivery campaigns of one charging model (e.g., cost per impression or CPM) and another prediction model may be generated for content delivery campaigns of another charging model (e.g., cost per click or CPC). As another example, one prediction model is generated for content delivery campaigns associated with one industry (e.g., related to software services) and another prediction model is generated for content delivery campaigns associated with another industry (e.g., related to financial services). As another example, one prediction model is generated for content delivery campaigns whose target audience is in one geographic region (e.g., the United States) and another prediction model is generated for content delivery campaigns whose target audience is in another geographic region (e.g., India). As another example, one prediction model is generated for campaigns for which historical data is available or there is sufficient historical data (e.g., more than 30 days) and another prediction model is generated for campaigns for which no historical data is available or there is insufficient historical data (e.g., less than 30 days of actual performance data).

If a prediction model is generated for content delivery campaigns based on one of the features disclosed herein, then the prediction model will not include a variable (or node, as described in more detail herein) for that feature since statistics of all content delivery campaigns that were used to generate the prediction model share the same feature value.

If multiple prediction models are generated, then, for a particular content delivery campaign, the appropriate prediction model is selected from the multiple prediction models based on one or more characteristics of the particular content delivery campaign. For example, model M1 is used to predict performance of campaign C1, model M2 is used to predict performance of campaigns C2 and C3, and model M3 is used to predict performance of campaign C4.

Providing Content Delivery Campaign Data

In an embodiment, a user (e.g., a representative of a content provider) provides (e.g., through a user interface) multiple sets of attributes of a content delivery campaign. Each set of attributes corresponds to a different instance of a content delivery campaign. For example, one instance of a content delivery campaign indicates that a target audience is limited to software engineers while another instance indicates that a target audience includes people with technical degrees in computer science, computer engineering, or electrical engineering. One of the sets of attributes may correspond to current attributes of the content delivery campaign, which may be actively being served by content delivery exchange 120.

Each set of attributes is input into a prediction model, which outputs an estimate of a metric (of the dependent variable of the prediction model). By comparing the outputs (whether automatically or manually), the user can see which instance of the content delivery campaign will perform better.

In an embodiment, a user provides two or more sets of attributes in a single file, which a campaign estimator accepts and then identifies each attribute set and inputs into a prediction model.

In a related embodiment, a user is allowed to input multiple attributes of a content delivery campaign and then, after viewing actual or estimated performance of the content delivery campaign, modify one or more attributes of the content delivery campaign to see an estimate of how performance might change based on the modified attribute(s).

In a related embodiment, a user interface allows a user to input an attribute value for each of multiple attributes {a1, a2, a3, . . . } of a content delivery campaign and allows the user, for a particular one of the attributes (e.g., a1}, to select multiple attribute values. For example, a user selects US and Europe as options for the geography of a target audience. Machine learning component 300 receives the attribute values and provides, to Performance predictor 340, attribute values for the content delivery campaign where the geography is US. Performance predictor 340 generates output that represents a first prediction of performance of the content delivery campaign. Machine learning component 300 also provides, to Performance predictor 340, attribute values for the content delivery campaign where the geography is Europe. Performance predictor 340 generates output that represents a second prediction of performance of the content delivery campaign.

Machine learning component 300 transmits, over a computer network, both predictions to a computing device of the user (e.g., the same computing device that displayed the user interface through which the user provided the campaign data).

Gradient Boosting Decision Trees

In an embodiment, a decision tree or an ensemble (or group) of decision trees is generated and used to predict a performance of a content delivery campaign and, optionally, generate one or more recommendations regarding how to improve predicted performance of the content delivery campaign.

An example of a decision tree ensemble includes gradient boosting decision trees. Gradient boosting is a machine learning technique for regression and classification problems. Gradient boosting produces a prediction model in the form of a set of ensemble of decision trees. Gradient boosting builds the model in a stage-wise fashion and generalizes the model by allowing optimization of an arbitrary differentiable loss function.

A decision tree is trained based on similar training data as described previously. A decision tree comprises one or more directed subtrees, each with a single root node and multiple leaf nodes. Each non-leaf node corresponds to a different feature or attribute of a content delivery campaign. A non-leaf node has multiple edges, each edge pointing to or associated with another node. Each edge corresponds to a specific feature value or a range of feature values.

Figure 4:
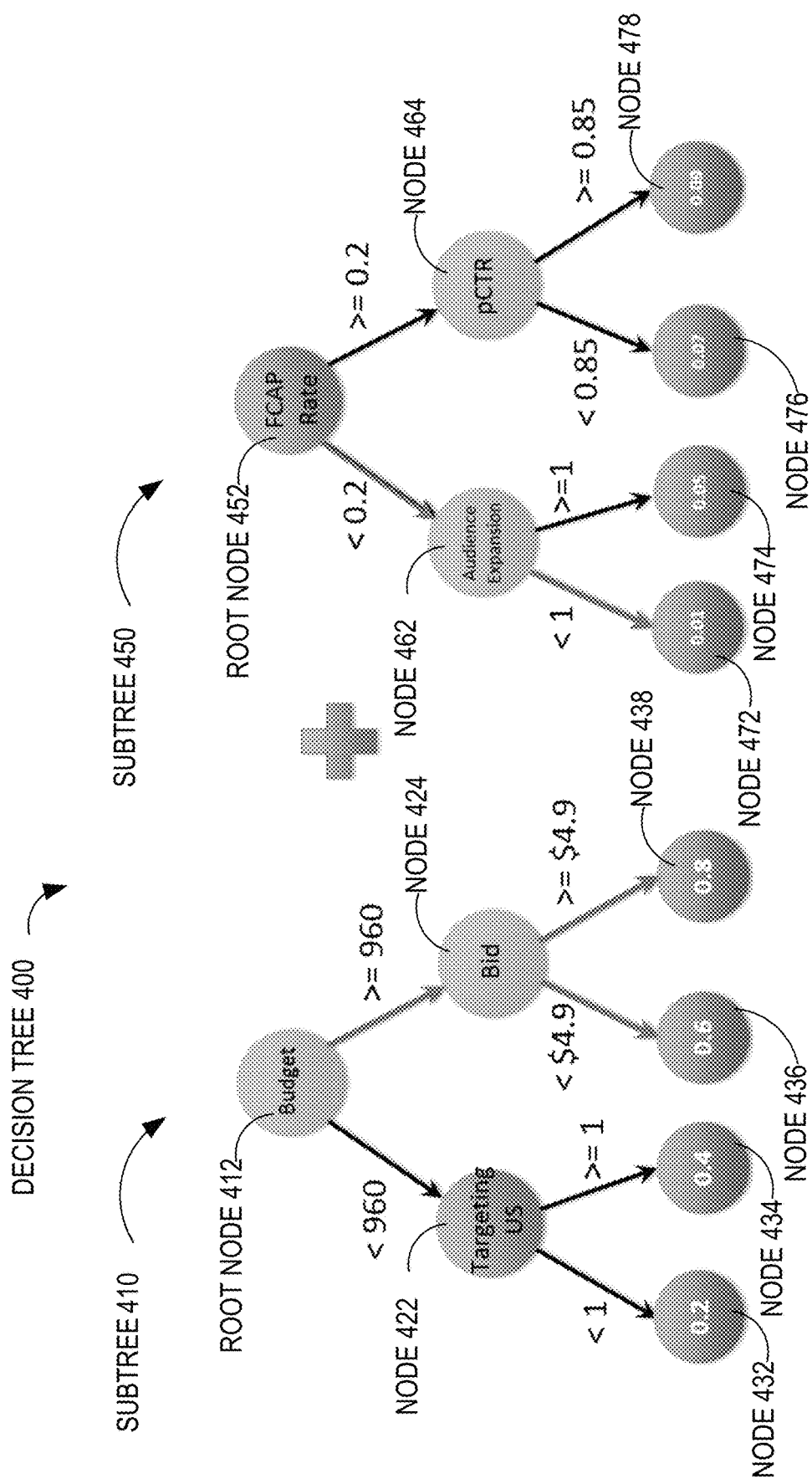
FIG. 4 is a diagram that depicts an example decision tree, in an embodiment.

FIG. 4 is a diagram that depicts an example decision tree ensemble 400, in an embodiment. Decision tree ensemble 400 comprises two subtrees: subtree 410 and subtree 450. Subtree 410 includes nodes 412-438 and subtree 450 includes nodes 452-478.

Root node 412 corresponds to campaign budget and has two edges emanating from root node 412. One edge corresponds to budget values less than 960 and the other edge corresponds to budget values greater than or equal to 960. This threshold value is determined by splitting the data into two groups (each group makes the prediction based on the average value of data within the group) that results in the greatest reduce of prediction error compared to no splitting.

A property of GBDTs is that the most impactful features (or the features that influence a predicted performance metric the most) are higher up the GBDT than the less impactful features. Thus, the most impactful feature may be the root node of the first subtree of a GBDT ensemble. Also, if a GBDT ensemble comprises multiple subtrees, then the subtrees have an importance or impactful ranking such that each subtree is more impactful or less impactful then another subtree. Thus, features represented by nodes in a higher ranked subtree are more impactful than features represented by nodes in a lower ranked subtree.

A decision tree generating technique may take one or more parameters as input, such as a depth value and a tree number value. The depth value influences how deep a subtree is (i.e., from a root node to a leaf node). The tree number value influences (e.g., limits) the number of subtrees that are created for a decision tree ensemble.

In an embodiment, two different nodes in different subtrees represent the same feature, but the thresholds or criteria associated with the different nodes are different. For example, the threshold bid price for node 424 is $4.90, but, in a different subtree that contains a node for bid price, the threshold bid price for that node is $5.75.

Predicting Performance of a Campaign Using a GBDT

In order to leverage a decision tree (e.g., a GBDT) to determine a predicted impact or performance of a proposed (or active) content delivery campaign, the attribute values of the campaign are used to traverse the decision tree. The attribute values may be ordered based on attribute, such that the order of the attribute values matches the order of the attributes in the GBDT, i.e., from root node to leaf node to the next root node (if a GBDT ensemble comprises multiple subtrees), etc. In the example of FIG. 4, the order of campaign attributes are budget, bid, audience expansion, and pCTR. (Attributes "Targeting US" and "FCAP rate" are attributes for which a content provider does not provide attribute values.)

Figure 5:
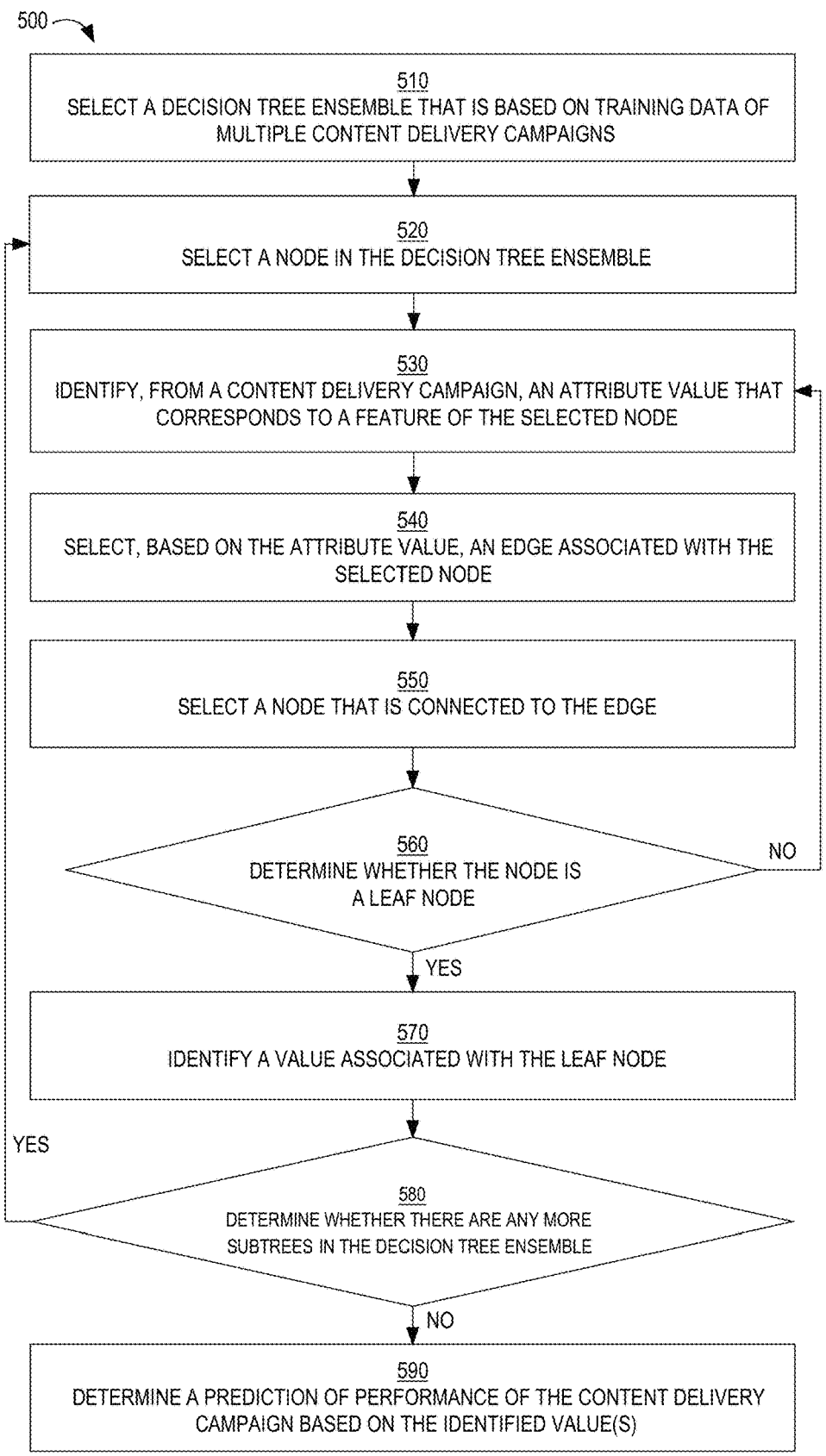
FIG. 5 is a flow diagram that depicts a process for predicting performance of a content delivery campaign based on attributes of the campaign, in an embodiment.

FIG. 5 is a flow diagram that depicts a process 500 for predicting performance of a content delivery campaign based on attributes of the campaign, in an embodiment. Process 500 may be implemented, at least partially, by performance predictor 340.

At block 510, a decision tree is selected. The decision tree may have been generated using a gradient boosting technique. The decision tree may be selected from among multiple possible decision trees. The decision tree may be selected based on one or more attribute values of a content delivery campaign whose performance will be predicted as a result of implementing process 500.

At block 520, a node in the decision tree is selected. Initially, the node that is selected is the root node of the decision tree.

At block 530, an attribute value, from the content delivery campaign, that corresponds to a feature of the selected node is identified.

At block 540, an edge is selected based on the attribute value and one or more criteria associated with the selected node. For example, if the attribute value satisfies a criterion associated with one of the edges of the selected node (e.g., the attribute value equals the criterion if the criterion is a value), then that edge is selected.

At block 550, a node is selected that is connected to the edge selected in block 540.

At block 560, it is determined whether the selected node of block 550 is a leaf node. If not, then process 500 proceeds to block 530. Otherwise, process 500 proceeds to block 570.

At block 570, a value associated with the leaf node is identified. The value indicates a prediction of performance of the content delivery campaign.

At block 580, it is determined whether there are any more subtrees in the decision tree ensemble to traverse. If not, then process 500 proceeds to block 590; otherwise, process 500 returns to block 520, where a root node in the next subtree is selected. If there are multiple subtrees remaining to be considered, then the highest ranking subtree is selected first.

At block 590, a prediction of campaign performance is determined based on the value(s) identified in block 570. If block 570 was performed multiple times while traversing a decision tree (indicating that the decision tree comprises multiple subtrees), then the values are added or summed together to generate a total value.

Given the decision tree ensemble in FIG. 4, the feature of root node 412 is determined to be campaign budget (corresponding to blocks 520-530). If a campaign's budget is greater or equal than $960, then the right edge of root node 412 is selected to arrive at node 424 (corresponding to blocks 540-550). Because node 424 is not a leaf node (corresponding to block 560), then the attribute value that corresponds to the feature of node 424 is determined (corresponding to block 530). If the campaign's bid is less than $4.90, then the left edge of node 424 is selected to arrive at node 436 (corresponding to blocks 540-550). Thus, based on subtree 410 alone, the content delivery campaign is predicted to result (in this example where daily budget utilization is the performance metric) in at least 60% budget utilization.

Continuing with the example, at least some of the remaining attribute values are used to traverse subtree 450. If the frequency capping of the campaign is less than 0.2 (which means that, among all the requests in which this campaign has been involved, the campaign has been filtered out 20% of the time due to a frequency cap restriction), then the left edge of node 452 is selected to arrive at node 462. If audience expansion is not enabled in the campaign, then the left edge of node 462 is selected to arrive at leaf node 472. Thus, based on subtrees 410 and 450, the content delivery campaign is predicted to result in 61% budget utilization.

Non-Negative Constraint on a Decision Tree

In an embodiment, a non-negative constraint is implemented relative to a decision tree (e.g., a GBDT). Each leaf node of a decision tree represents a prediction of a performance metric if one or more attributes of a content delivery campaign match the attributes of nodes that are traversed from the root node to the leaf node. If a leaf node indicates a negative value, then that leaf node may be removed or discarded, along with all edges that point to that leaf node. Such removal is appropriate because for most (if not all) performance metrics, a negative prediction does not make sense. For example, it is impossible for a content delivery campaign to have a negative number of impressions or clicks or to have a negative cost-per-click.

By removing edges and leaf nodes in this way, a decision tree can be reduced in size, which may reduce the time required to analyze the decision tree (given a set of attribute values of a campaign) to make predictions and recommendations for the campaign. For example, certain nodes that might have been traversed while predicting performance of a content delivery campaign using one or more different feature values are removed from the decision tree.

In an embodiment, the non-negative constraint is implemented while generating a decision tree. Alternatively, the non-negative constraint is implemented after a decision tree is generated, such that leaf nodes with negative values are generated and then removed during an application of the non-negative constraint. In a related embodiment, a non-negative constraint is applied in the first subtree of a decision tree, but not in other (subsequent) subtrees in the decision tree.

Generating Recommendations

In an embodiment, a recommendation regarding how to improve a content delivery campaign is generated using a prediction model, such as a regression model or a GBDT. For example, different input are automatically input into in the prediction model. The inputs may be automatically selected by Performance predictor 340 based on a range of known values for each feature or attribute of a content delivery campaign. For example, Performance predictor 340 may store a range of acceptable bid prices and adjust the bid price (provided by a content provider) to determine which bid price either produces a better performance outcome or the same performance outcome for a lower price.

Figure 6:
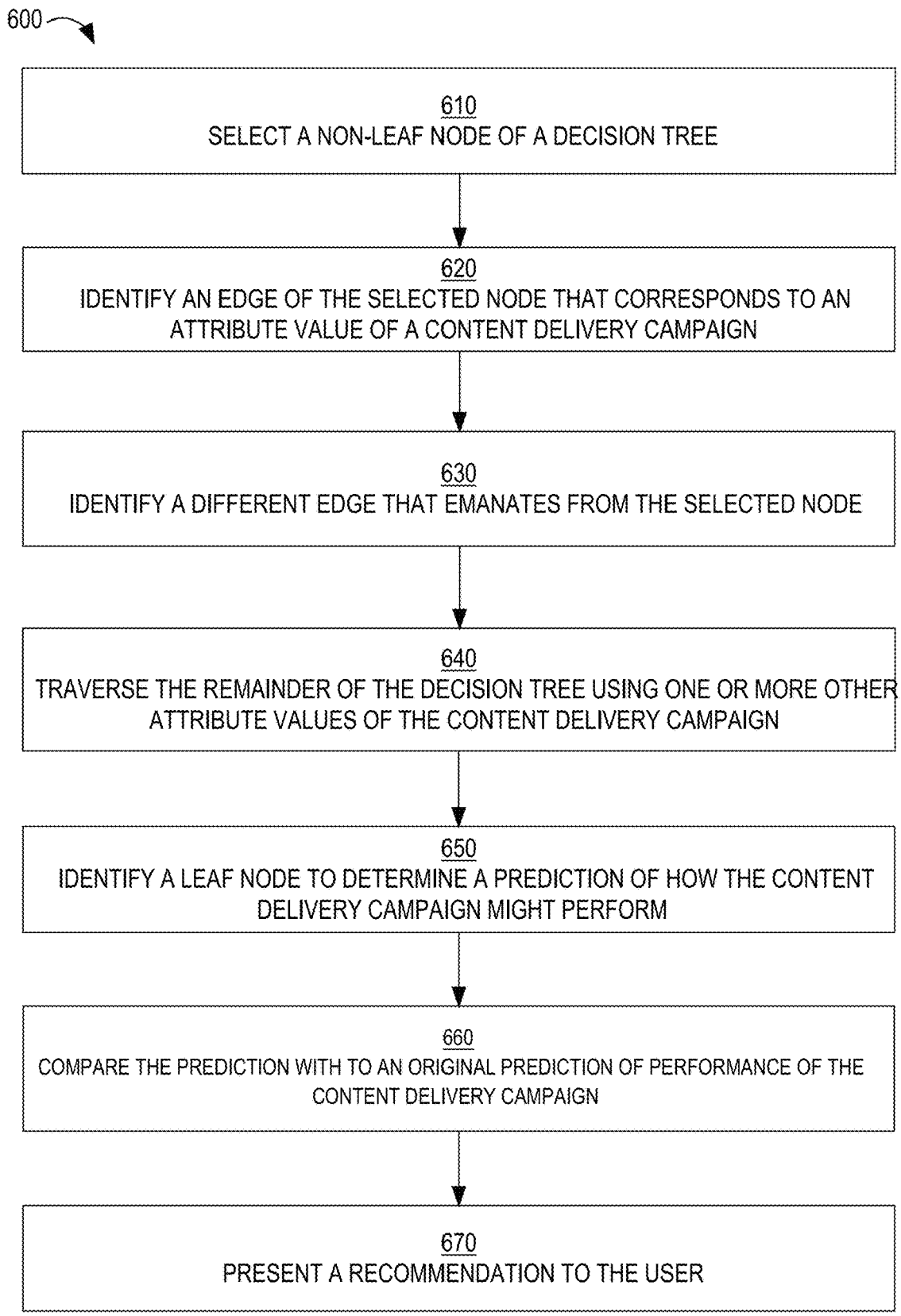
FIG. 6 is a flow diagram that depicts a process for generating one or more recommendations for a content delivery campaign using a decision tree, in an embodiment.

FIG. 6 is a flow diagram that depicts a process 600 for generating one or more recommendations for a content delivery campaign using a decision tree (e.g., a GBDT), in an embodiment. Process 600 may be implemented, at least partially, by performance predictor 340.

At block 610, a non-leaf node in a GBDT ensemble is selected. The non-leaf node may be a root node or an intermediate node in the GBDT ensemble.

At block 620, an edge from the selected node is identified. The edge corresponds to an attribute value of the content delivery campaign is identified. For example, in FIG. 4, a bid price of the content delivery campaign is $4.80, which means the left edge of node 424 is identified.

At block 630, a different edge from the selected node is identified. Continuing with the example, the right edge emanating from node 424 is identified. The right edge represents a different path down the GBDT ensemble. Following the right edge down the GBDT ensemble results in a different prediction. Block 630 may be referred to as "flipping a node."

Blocks 620-630 may instead involve determining whether the "highest predicted performing" edge was selected for the original content delivery campaign and, if not, then selecting that edge.

At block 640, one or more of the remaining attribute values of the content delivery campaign are used to traverse the remainder of the GBDT ensemble. In other words, only one attribute value from the content delivery campaign is changed.

At block 650, a leaf node is identified to determine a prediction of how the content delivery campaign might perform. This prediction is based on changing at least one of the attribute values of the content delivery campaign.

At block 660, the prediction determined in block 650 is compared to an original or initial prediction of performance of running or activating the content delivery campaign as is, or as the content provider indicated.

At block 670, a recommendation is presented to a user (e.g., a representative of the content provider of the content delivery campaign). Block 670 may be performed only if the prediction determined in block 650 indicates a higher or better performance than the original prediction or indicates a similar performance but with lower cost (e.g., in dollars or in difficulty). The recommendation indicates the attribute(s) whose value(s) changed that resulted in the improved predicted performance, the original and changed value(s), and/or the predicted improvement (e.g., 22% lower cost-per-click or 52% higher budget utilization).

In the example of FIG. 4, given the original feature values of a content delivery campaign, its predicted performance is 0.6+0.01=0.61 or 61% daily budget utilization. If the bid price is increased to $4.90, then, all else remaining the same, the predicted performance is 0.8+0.01=0.81 or 81% daily budget utilization. This represents an almost 32.8% increase in daily budget utilization. All three values may be presented as part of a recommendation to a content provider that submitted the attribute values of the content delivery campaign.

Actionable and Non-Actionable Nodes

In an embodiment, a node is either an actionable node or a non-actionable node. An "actionable node" is a node that corresponds to a feature that a content provider is able to change for its content delivery campaign. Examples of actionable nodes are ones that correspond to budget, bid price, enable audience expansion, industry, and target audience. A "non-actionable node" is a node that corresponds to a feature that a content provider is not able to change for its content delivery campaign. Examples of non-actionable nodes might be ones that correspond to whether a campaign targets a US audience, whether a campaign targets English speakers, and frequency capping (which indicates how often a user is presented a particular content item over a period of time). Content providers may not be able to or allowed to adjust such features in their respective content delivery campaigns. When training a prediction model, a user may specify a feature as actionable or non-actionable. If nothing is specified for a feature, then the default may be actionable.

One reason for including non-actionable nodes is to correct bias in the prediction model. For example, display position may be a non-actionable node (thus, content providers do not have control in which position a content item will display). However, not including this feature in the prediction model would cause bias in the prediction model to increase since the prediction model does not know whether a campaign has high delivery due to the campaign having good quality content items or a high bid, or just because content items of the campaign were displayed at "high"/good positions in a display.

Ranking Recommendations

In an embodiment, multiple recommendations are generated for a content provider of a particular content delivery campaign and are ranked prior to presenting the recommendations to the content provider. A set of recommendations for a content provider may be ranked based on one or more criteria. One example ranking criterion is predicted impact on performance. For example, if one recommendation would result in an increased delivery of 25% and another recommendation would result in an increased delivery of 12%, then the first recommendation is ranked higher than the second recommendation.

Another example ranking criterion is least expensive or least difficult to implement recommendation. Different nodes in a GBDT ensemble may be associated with different cost values. For example, if one recommendation is less expensive than another recommendation (e.g., in terms of budget or price), then the first recommendation is ranked higher than the second recommendation. Cost may be reflected in the GBDT ensemble itself (e.g., budget or bid price) or outside the GBDT ensemble. For example, enabling audience expansion may be associated with a cost (that is not reflected in the GBDT ensemble directly but is known to machine learning component 300) that a content provider must pay in order to have it enabled.

Similarly, if one recommendation is more difficult to implement than another recommendation (e.g., increasing pCTR or changing an image may be more difficult than selecting enabling audience expansion), then the second recommendation is ranked higher than the first recommendation. Again, a node in a GBDT ensemble may be associated with a difficulty rating that indicates a level of difficulty in changing the attribute value that corresponds to the node.

In an embodiment, recommendations are ranked based on which node in a decision tree was "flipped." For example, a first recommendation is determined based on flipping the highest ranked node (in the decision tree ensemble) for which the original content delivery campaign corresponds to a lower performing edge of that node. Then, a second recommendation is determined based on flipping the second highest ranked node (in the decision tree ensemble) for which the original content delivery campaign corresponds to a lower performing edge of that node. In the example of FIG. 4, the highest ranked node is node 424, since the original content delivery campaign has a bid price of less than $4.90. The second highest ranked node is node 462 since node 452 is a non-actionable node and the original content delivery campaign does not have audience expansion enabled.

Multiple Performance Metrics

As described herein, a prediction model may be generated for each of multiple performance metrics. In an embodiment, a user (e.g., a representative of a content provider) is presented with multiple options (each option corresponding to a different performance metric) and selects one of the options. Performance predictor 340 may generate a user interface that includes the multiple options and provide the user interface over a network to a computing device of the user.

The selected performance metric may be selected (a) prior to the user providing attributes of a content delivery campaign (e.g., through a user interface) or (b) after the user provides attributes of the content delivery campaign.

Different content providers' goals may result in different recommendations. For example, increasing budget or bid price may be a recommendation for content providers whose goal is to increase impressions while improving the quality of the text and/or image in a content item may be a recommendation for content providers whose goal is to increase conversions (e.g., online purchases or filling out a form).

Testing Images and Text

In some scenarios, certain features of a content delivery campaign may not be easily digestible, interpretable, or understandable by an end user. Example types of such features are image features and text features. It is difficult to adjust a single attribute of an image without providing an entirely new (and different) image.

In an embodiment, a user is allowed to provide different images and/or text to determine which image/text results in a higher predicted performance. For example, a user uploads two images associated with a content delivery campaign along with providing multiple attribute values of attributes of the campaign to Performance predictor 340. Performance predictor 340 leverages a prediction model (e.g., a GBDT ensemble or a regression model) to generate two predictions: a first prediction for one image and a second prediction for the other image. A user interface may indicate a score adjacent to each image, such that it is clear which image is predicted to result in higher performance than the other image.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
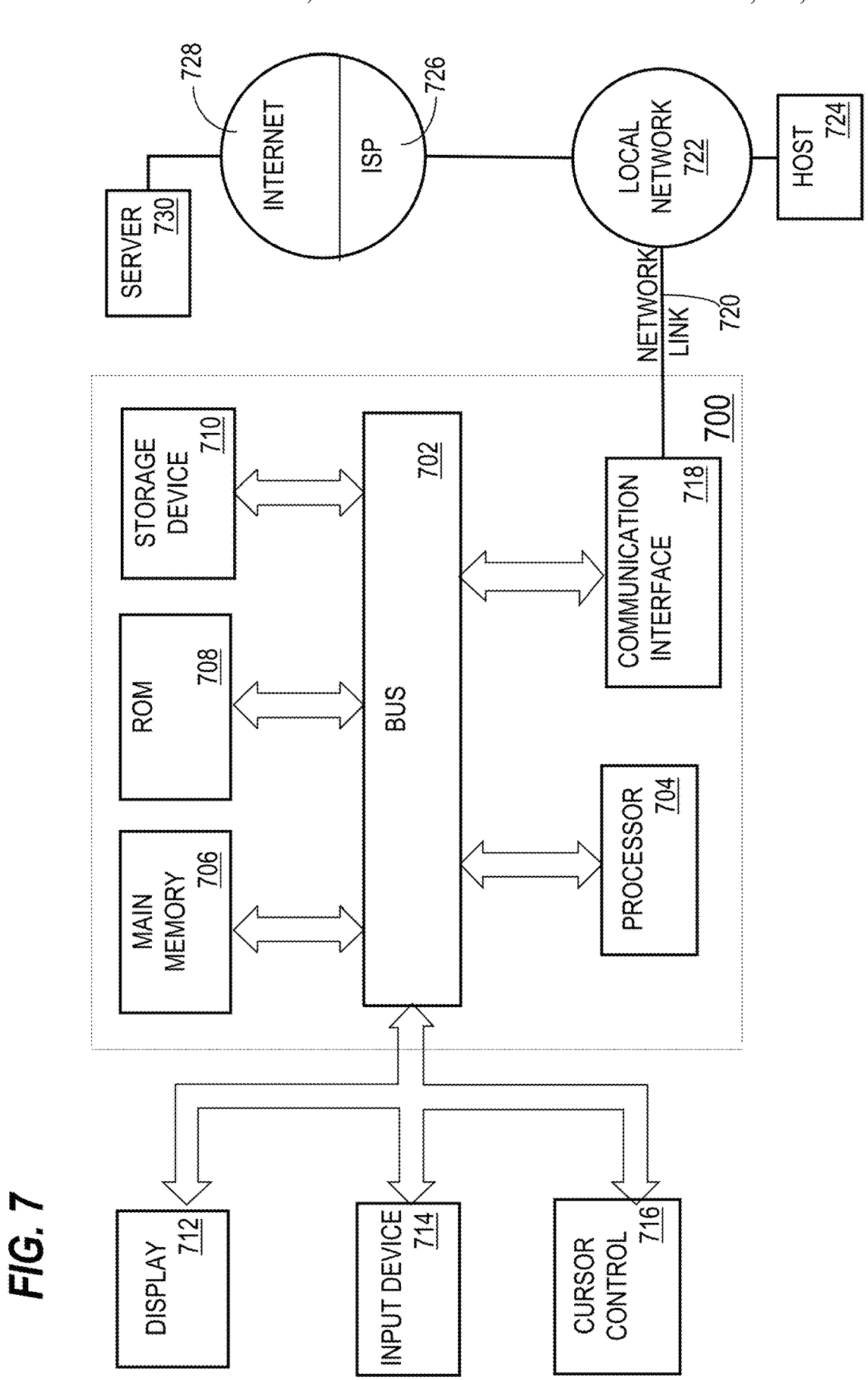
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating a decision tree based on training data that comprises a plurality of training instances, each of which comprises a feature value for each of a plurality of features and a label of a target variable;
    wherein the plurality of features correspond to campaign-level or serving attributes of multiple content delivery campaigns;
    wherein the decision tree comprises one or more subtrees;
    receiving a first plurality of feature values, for the plurality of features, of a first content delivery campaign that comprises one or more content items that are separate from the first content delivery campaign;
    traversing the decision tree using the first plurality of feature values to generate non-binary output pertaining to a predicted performance metric of the first content delivery campaign;
    based on the output, identifying one or more recommendations;
    causing the one or more recommendations to be presented on a computing device associated with the first content delivery campaign;
    wherein the method is performed by one or more computing devices.

2. The method of claim 1, further comprising:
    determining that a leaf node of a subtree of the one or more subtrees is negative;
    in response to determining that the leaf node of the subtree is negative, removing the leaf node from the subtree.

3. The method of claim 1, wherein traversing the decision tree comprises:
    identifying a first node, in the decision tree, that corresponds to a first feature value of the first plurality of feature values;
    performing a first comparison between the first feature value and one or more first criteria associated with the first node;
    based on the first comparison, identifying a first edge of multiple edges of the first node;
    based on the first edge, identifying a second node, in the decision tree, that corresponds to a second feature value of the first plurality of feature values;
    performing a second comparison between the second feature value and one or more second criteria associated with the second node;
    based on the second comparison, identifying a leaf node that indicates a prediction;
    wherein the output is based on the prediction.

4. The method of claim 3, wherein:
    the prediction is a first prediction;
    the one or more subtrees are a plurality of subtrees that include a first subtree and a second subtree that is different than the first subtree;
    the leaf node is a first leaf node of the first subtree;
    the method further comprising:
        identifying a third node, in the second subtree, that corresponds to a third feature value of the first plurality of feature values;
        performing a third comparison between the third feature value and one or more third criteria associated with the third node;
        based on the third comparison, identifying a third edge of multiple edges of the third node;
        based on the third edge, identifying a fourth node, in the second subtree, that corresponds to a fourth feature value of the first plurality of feature values;
        performing a fourth comparison between the fourth feature value and one or more fourth criteria associated with the fourth node;
        based on the fourth comparison, identifying a second leaf node that indicates a second prediction;
    the output is based on the second prediction.

5. The method of claim 1, wherein identifying the one or more recommendations comprises:
    based on the first plurality of feature values, traversing the decision tree to determine a first prediction of performance of the first content delivery campaign;
    based on a second plurality of feature values, traversing the decision tree to determine a second prediction of performance of the first content delivery campaign;
    wherein the second plurality of feature values includes a subset of feature values that matches a subset of feature values of the first plurality of feature values;

wherein the second plurality of feature values includes one or more feature values that are not in the first plurality of feature values.

6. The method of claim 1, further comprising:
storing data that identifies one or more nodes in the decision tree that correspond to one or more attributes, of content delivery campaigns, whose values are not allowed to be changed by a content provider of the first content delivery campaign.

7. The method of claim 1, wherein the one or more recommendations identifies a particular feature value, of the first plurality of feature values, to modify.

8. The method of claim 1, wherein the one or more recommendations identifies how much to modify a particular feature value of the first plurality of feature values.

9. The method of claim 1, wherein the one or more recommendations are a plurality of recommendations, wherein the method further comprising:
identifying a ranking of the plurality of recommendations;
causing the one or more recommendations to be presented comprises causing the plurality of recommendations to be presented based on the ranking.

10. The method of claim 1, wherein:
the output is first output;
one or more of the plurality of features correspond to text;
one or more of the first plurality of feature values correspond to first text;
the method further comprising:
traversing the decision tree using a second plurality of feature values, for the plurality of features, of the first content delivery campaign to generate second output that is different than the first output;
one or more of the second plurality of feature values correspond to second text that is different than the first text;
a difference between the first output and the second output indicates which of the first text or the second text should be used for the first content delivery campaign.

11. The method of claim 1, wherein:
the output is first output;
one or more of the plurality of features corresponds to images;
one or more of the first plurality of feature values correspond to a first image;
the method further comprising traversing the decision tree using a second plurality of feature values, for the plurality of features, of the first content delivery campaign to generate second output that is different than the first output;
one or more of the second plurality of feature values correspond to a second image that is different than the first image;
a difference between the first output and the second output indicates which of the first image or the second image should be used for the first content delivery campaign.

12. The method of claim 1, wherein the output indicates one of a predicted budget utilization, predicted conversion rate, or predicted cost-per click.

13. A method comprising:
generating a prediction model based on training data that comprises a plurality of training instances, each of which comprises a feature value for each of a plurality of features and a label of a target variable;
wherein the training data is related to multiple campaign-level or serving attributes of each campaign of a plurality of content delivery campaigns;
receiving a first plurality of feature values, for the plurality of features, of a first content delivery campaign that comprises one or more content items that are separate from the first content delivery campaign;
inputting, into the prediction model, the first plurality of feature values to generate output;
based on the output from the prediction model, identifying one or more recommendations;
causing the one or more recommendations to be presented on a computing device associated with the first content delivery campaign;
wherein the method is performed by one or more computing devices.

14. One or more storage media storing instructions which, when executed by one or more processors, cause:
generating a decision tree based on training data that comprises a plurality of training instances, each of which comprises a feature value for each of a plurality of features and a label of a target variable;
wherein the plurality of features correspond to campaign-level or serving attributes of multiple content delivery campaigns;
wherein the decision tree comprises one or more subtrees;
receiving a first plurality of feature values, for the plurality of features, of a first content delivery campaign that comprises one or more content items that are separate from the first content delivery campaign;
traversing the decision tree using the first plurality of feature values to generate output;
based on the output, identifying one or more recommendations;
causing the one or more recommendations to be presented on a computing device associated with the first content delivery campaign.

15. The one or more storage media of claim 14, wherein the instructions, when executed by the one or more processors, further cause:
determining that a leaf node of a subtree of the one or more subtrees is negative;
in response to determining that the leaf node of the subtree is negative, removing the leaf node from the subtree.

16. The one or more storage media of claim 14, wherein traversing the decision tree comprises:
identifying a first node, in the decision tree, that corresponds to a first feature value of the first plurality of feature values;
performing a first comparison between the first feature value and one or more first criteria associated with the first node;
based on the first comparison, identifying a first edge of multiple edges of the first node;
based on the first edge, identifying a second node, in the decision tree, that corresponds to a second feature value of the first plurality of feature values;
performing a second comparison between the second feature value and one or more second criteria associated with the second node;
based on the second comparison, identifying a leaf node that indicates a prediction;
wherein the output is based on the prediction.

17. The one or more storage media of claim 16, wherein:
the prediction is a first prediction;
the one or more subtrees are a plurality of subtrees that include a first subtree and a second subtree that is different than the first subtree;
the leaf node is a first leaf node of the first subtree;

the instructions, when executed by the one or more processors, further cause:

identifying a third node, in the second subtree, that corresponds to a third feature value of the first plurality of feature values;

performing a third comparison between the third feature value and one or more third criteria associated with the third node;

based on the third comparison, identifying a third edge of multiple edges of the third node;

based on the third edge, identifying a fourth node, in the second subtree, that corresponds to a fourth feature value of the first plurality of feature values;

performing a fourth comparison between the fourth feature value and one or more fourth criteria associated with the fourth node;

based on the fourth comparison, identifying a second leaf node that indicates a second prediction;

the output is based on the second prediction.

18. The one or more storage media of claim 14, wherein identifying the one or more recommendations comprises:

based on the first plurality of feature values, traversing the decision tree to determine a first prediction of performance of the first content delivery campaign;

based on a second plurality of feature values, traversing the decision tree to determine a second prediction of performance of the first content delivery campaign;

wherein the second plurality of feature values includes a subset of feature values that matches a subset of feature values of the first plurality of feature values;

wherein the second plurality of feature values includes one or more feature values that are not in the first plurality of feature values.

19. The one or more storage media of claim 14, wherein the instructions, when executed by the one or more processors, further cause:

storing data that identifies one or more nodes in the decision tree that correspond to one or more attributes, of content delivery campaigns, whose values are not allowed to be changed by a content provider of the first content delivery campaign.

20. The one or more storage media of claim 14, wherein the one or more recommendations are a plurality of recommendations, wherein the instructions, when executed by the one or more processors, further cause:

identifying a ranking of the plurality of recommendations;

causing the one or more recommendations to be presented comprises causing the plurality of recommendations to be presented based on the ranking.

* * * * *